US008970698B2

(12) United States Patent
Christensen et al.

(10) Patent No.: US 8,970,698 B2
(45) Date of Patent: Mar. 3, 2015

(54) OPEN PLATFORM SURVEILLANCE/MONITORING SYSTEM AND METHOD

(75) Inventors: Anders Bent Christensen, Gentofte (DK); Søren Eschricht Jensen, Føllenslev (DK)

(73) Assignee: Milestone Systems A/S, Brondby (DK)

( * ) Notice: Subject to any disclaimer, the term of this patent is extended or adjusted under 35 U.S.C. 154(b) by 165 days.

(21) Appl. No.: 13/878,162

(22) PCT Filed: Oct. 7, 2011

(86) PCT No.: PCT/DK2011/050380
§ 371 (c)(1),
(2), (4) Date: Apr. 5, 2013

(87) PCT Pub. No.: WO2012/045315
PCT Pub. Date: Apr. 12, 2012

(65) Prior Publication Data
US 2013/0201332 A1 Aug. 8, 2013

Related U.S. Application Data

(60) Provisional application No. 61/390,767, filed on Oct. 7, 2010.

(30) Foreign Application Priority Data

Oct. 7, 2010 (EP) .................................... 10186855

(51) Int. Cl.
*H04N 7/18* (2006.01)
*G06F 21/55* (2013.01)
*G06F 21/62* (2013.01)
*H04L 29/06* (2006.01)
*H04L 29/08* (2006.01)

(52) U.S. Cl.
CPC ............... *H04N 7/18* (2013.01); *G06F 21/552* (2013.01); *G06F 21/6236* (2013.01);
(Continued)

(58) Field of Classification Search
CPC ................................. H04N 7/18; G06F 21/552
USPC ............................................................ 348/143
See application file for complete search history.

(56) References Cited

U.S. PATENT DOCUMENTS

| 5,263,147 A | 11/1993 | Francisco et al. |
| 5,987,611 A | 11/1999 | Freund |
| 2007/0011746 A1 | 1/2007 | Malpani et al. |

FOREIGN PATENT DOCUMENTS

WO 01/25884 A1 4/2001

OTHER PUBLICATIONS

International Search Report, International Application No. PCT/DK2011/050380, mailed Dec. 23, 2011, two (2) pages.

(Continued)

*Primary Examiner* — Dave Czekaj
*Assistant Examiner* — Berteau Joisil
(74) *Attorney, Agent, or Firm* — Nath, Goldberg & Meyer; Jerald L. Meyer; Tiffany A. Johnson

(57) ABSTRACT

The invention relates to a surveillance/monitoring system, comprising one or more peripheral devices for generating surveillance/monitoring signals and/or data, and a management system for controlling the peripheral devices. The management system comprises one or more applications, wherein each application is provided with an application-specific environment. The surveillance/monitoring system further comprises at least one value-added solution, each value-added solution comprising an external component and an application-independent adaption layer through which the external component communicates with the application-specific environment by implementing at least one first interaction request to the adaption layer according to a pre-defined application- independent interaction interface. The application-specific environment is configured to mediate at least one interaction between the value-added solution and the surveillance/monitoring system by matching the at least one first interaction request with at least one second interaction request from the surveillance/monitoring system and fulfilling the interaction if a match is found.

16 Claims, 3 Drawing Sheets

(52) U.S. Cl.
CPC ......... *H04L 63/1408* (2013.01); *H04L 67/125* (2013.01); *H04L 67/12* (2013.01); *G06F 2221/2101* (2013.01); *G06F 2221/2153* (2013.01); *G06F 2221/2115* (2013.01)
USPC ........................................................ 348/143

(56) References Cited

OTHER PUBLICATIONS

European Search Report, Application No. EP 10 18 6855, dated Feb. 14, 2011, two (2) pages.

OPEN PLATFORM SURVEILLANCE/MONITORING SYSTEM AND METHOD

This is a National Phase Application filed under 35 U.S.C. 371 as a national stage of PCT/DK2011/050380, filed Oct. 7, 2011, and claiming benefit from European Application No. EP 10186855.2, filed Oct. 7, 2010, and benefit from U.S. Application Ser. No. 61/390,767, filed Oct. 7, 2010, the content of each of the cited applications is hereby incorporated by reference in its entirety.

TECHNICAL FIELD

The invention relates to a system for surveillance and/or monitoring, comprising one or more peripheral devices for generating surveillance/monitoring signals and/or data, and a management system for controlling the peripheral devices, the management system comprising one or more applications. In a particular aspect, the invention relates to an open platform system for surveillance and/or monitoring.

According to a further aspect, the invention relates to a method for integrating a hardware device in a surveillance/monitoring system. According to a broader aspect, the invention relates to a method for integrating an external component with a surveillance/monitoring system. In a particular aspect, the invention further relates to a method for integrating an external component with an open platform system for surveillance and/or monitoring.

BACKGROUND

Modern surveillance systems have evolved into highly complex and often heterogeneous systems comprising a large number of different analogue and digital peripheral devices and computer hardware elements that are tied together via a networked infrastructure, and controlled by means of advanced management software. In this rapidly evolving field, surveillance/monitoring systems therefore face the constant challenge to support, handle and exploit a great variety of different hardware devices from a large number of different suppliers, wherein each hardware device usually comes with its own driver components and interfaces. Complex surveillance systems are therefore most suitably based on management software, which is build according to an open platform architecture with external programming interfaces allowing third party providers to program components that add value to the surveillance/monitoring system in the form of additional features and/or functionalities—without having to recode the management software.

When integrating external components in known systems, even in an open platform architecture, a large effort is required to ensure compatibility with different types of applications within the platform or with different versions of the same application. This adds considerably to the cost for developing and maintaining a given surveillance/monitoring system that typically relies on a considerable investment in specific peripheral hardware for providing signals and data, which instead of evolving with an improvement of the management software in the worst case may become useless.

U.S. Pat. No. 5,987,611 relates to a system for client-based monitoring and filtering of network access, which operates in conjunction with a centralized enforcement supervisor. A client-side filter is controlled by the centralized authority as long as the centralized authority has a way of enforcing non-compliance with pre-defined access rules, for example, by blocking access to an open network, such as a WAN or the Internet. U.S. Pat. No. 5,263,147 relates to a system for managing access to objects on a computer system, such as data and/or peripheral devices, where such access is requested from subjects, such as user applications running on a base computer of the system. Peripheral devices are coupled to the system through an external component representing the peripheral device and communicating with the system through a common executive platform. Each external component implements the peripheral device directly to the common executive platform of the system.

One way of addressing the problem of version stability and portability to different platforms is addressed by U.S. 2003/0079052. U.S. 2003/0079052 discloses the implementation of a platform independent plug-in, a so-called pluglet, for execution under a host application, wherein the disclosed host application is an internet browser, and wherein a specific implementation of the internet browser on a given operating system is referred to as a platform. The plug-in adds functionality to the browser, or enables the execution of an application within the browser. Different tasks, such as rendering different MIME types, require different pluglets. Each pluglet comprises a plug-in application programming interface (API) that cooperates with a so-called pluglet engine API through which the host application may access or exploit the functionality of the pluglet in a platform independent manner. The pluglet of U.S. 2003/0079052 is configured for performing a specific task in a host application in a platform independent manner. While the pluglet thereby addresses the problem of version stability and portability between similar host applications from different suppliers, it does not account for the highly complex nature of surveillance/monitoring systems.

DISCLOSURE OF THE INVENTION

Therefore, it is an object of the invention to provide a system for surveillance and/or monitoring and a method for integrating external components in a surveillance/monitoring system overcoming at least some of the above mentioned problems or to provide an alternative.

This is achieved by a surveillance/monitoring system of the above mentioned type, wherein each application is provided with an application-specific environment, the surveillance/monitoring system further comprising at least one value-added solution placed in context with at least one of the applications, each value-added solution comprising an external component and each value-added solution comprising an application-independent adaption layer through which the external component communicates with the application-specific environment by implementing at least one first interaction request to the adaption layer according to a pre-defined application-independent interaction interface, and wherein the application-specific environment is configured to transparently mediate at least one interaction between the value-added solution and the surveillance/monitoring system by matching the at least one first interaction request with at least one second interaction request from the surveillance/monitoring system, wherein any interaction request from the value-added solution is handled by the application-specific environment according to the context of the application into which the value-added solution is placed, and fulfilling the interaction if a match is found.

"Surveillance" refers to gathering data and preferably also analysing data by means of one or more, typically a plurality of peripheral recording devices, such as cameras, audio recording equipment, or the like. Surveillance may be for purposes like general security, crime prevention, traffic control, or similar.

"Monitoring" further covers gathering data, and preferably also analysing data, by means of peripheral devices. The peripheral devices may be traditional measurement or sensing devices, such as sensors for biological, chemical, or physical quantities/parameters, but may also include audio and video signals. Typical purposes for monitoring may be documentation, medical observation, building management, production and/or process control.

"Analysing" may be by comparison, by means of suitable algorithms testing for predetermined criteria or identifying/selecting a predetermined state, and may comprise initiation of a response to a given state or change in state, e.g. triggering an alarm, granting/refusing access, starting a recording, bringing an output of a certain hardware device in focus on a monitoring screen, or automatically changing control parameters of a production process. Analysis may be performed centrally or distributed/remote at a respective peripheral device A "management system" implements and controls the operation of a system, here a system for surveillance and/or monitoring. The management system includes dedicated computer means, such as application servers and storage means. The management system may be operated on a single centralised computer. Typically in larger systems, the management system is, however, distributed in a cluster or a networked arrangement of different computing means/units for retrieving, processing and storing of data. The management system is typically adapted to configure and control the peripheral devices, as well as retrieve and exploit the data generated by these peripheral devices by means of one or more applications. Preferably, the management system is configured as an open platform. That means, it comprises external programming interfaces that allow adding features/functionality and/or integration of external devices to the surveillance/monitoring system without requiring modification of the management system itself.

Matching of interaction requests and fulfilment of an interaction is handled by the application-specific environment. The application-specific environment thus mediates the interaction of the value-added solution with the surveillance/monitoring system. Even when fulfilling an interaction between a first and a second interaction requester, the two requesters are not connected directly to each other: the interaction is transparent. Passing the interaction through mediation by the application-specific environment thus keeps the interaction transparent to each of the parties involved in the interaction, i.e. neither of the parties requires any knowledge about any of the other parties. Both the application itself and the value-added solutions may be party to an interaction only by communicating with the application-specific environment through a pre-defined interface between the party and the application-specific environment.

The anonymous nature of the interaction has the advantage that a provider of a value-added solution only has to implement the interaction requests of the external component to the pre-determined application-independent adaption layer when coding the value-added solution. Any interaction request from the value-added solution will then be handled by the application-specific environment according to the context of the application into which the value-added solution is placed—without any need for recoding of the value-added solution. Which interaction requests are available from the various parties depends on the given context. The context thus dictates which interaction requests are matched and thus which interactions can be fulfilled by the application-specific environment. First interaction requests that in a given context can or need not be matched with corresponding second interaction request, may be tracked by the application-specific environment, but will not be fulfilled.

Furthermore, the interaction mediated by the application-specific environment is open for serving any number of parties that may have matching interaction requests in a given context. Thereby a high level of connectivity and flexibility is achieved that allows to build and modify a surveillance/monitoring system without having to modify the code of the building blocks.

Further according to one embodiment of the surveillance/monitoring system, the application-specific environment mediates interaction between the value-added solution and the application.

The value-added solution is integrated with a given application within the surveillance/monitoring system by inserting the value-added solution in the application-specific environment of that application. Both the value-added solution and the application may be configured with interaction requests at their respective interfaces with the application-specific environment. The application-specific environment acts as a broker for these interaction requests and thus mediates the interaction between the value-added solution and the application.

Since the value-added solution by means of the application-independent adaption layer only deals directly with the application-specific environment as a supplier of input and as a recipient of output, type and version of the application becomes irrelevant for compatibility. The same value-added solution can therefore easily be integrated in a large variety of completely different types of applications without having to recode the value-added solution, and may yet interact with any of these applications. Also, revision changes to the application including changes in the functionality of the application, do not matter for the continued usability of the same value-added solution in the application as long as the application-specific environment remains configured to mediate interaction according to the pre-determined interaction interface.

Further according to one embodiment, the surveillance/monitoring system comprises a plurality of value-added solutions, wherein the application-specific environment mediates interaction between different value-added solutions.

As mentioned above, the interaction between different components is transparent with respect to all parties involved. The value-added solution therefore does not distinguish between an interaction with the application with which it is integrated and an interaction with another value-added solution integrated with the application in the same application-specific environment. The same value-added solution may therefore simultaneously serve and/or exploit a plurality of interacting parties, including the application and/or further value-added solutions, mediated by the application-specific environment and without knowing about any of the other parties.

Further according to one embodiment of the surveillance/monitoring system the interaction request is a request for input or a request for output.

All parties to the interaction are provided with the same, application-independent interaction interface having input and output elements to which interaction requests are implemented. An interaction request may be a request for input, for example by activation of an input element of the application-independent interaction interface for receiving input. Accordingly a request for output may be the activation of an output element of the application-independent interaction interface for offering output.

A single interaction is fulfilled if an active first input element is met by a matching active second output element or if an active first output element is met by a matching active second input element.

Second interaction requests may be placed, i.e. communicated to a given application-specific environment, by the application itself and/or any other value-added solution in the application-specific environment. A given first interaction request may serve a plurality of second interaction requests. The value-added solution may thus interact with a plurality of parties simultaneously.

As mentioned above, the interaction between parties is transparent, i.e. configuration, content and/or functionality may be exchanged without the interacting parties knowing of each other. A given value-added solution therefore does not have any knowledge of the number of interacting parties, either, and the number may be changed without any changes to the given value-added solution.

Preferably, the input elements have thereto corresponding output elements. Correspondence means here that a given input element may be matched/identified/paired with a corresponding output element. In order to establish an interaction, the application-specific environment queries/collects/tracks the interaction requests and interaction offers of all parties, matches corresponding input and output elements and fulfils the interaction if matching interaction requests and interaction offers are found at corresponding input and output elements. Thereby, the interaction requests and offers are efficiently matched by matching corresponding input and output elements.

Further according to one embodiment of the surveillance/monitoring system the interaction comprises exchange of configuration, exchange of functionality and/or retrieval and delivery of content data.

The value-added solutions may interact with each other and/or with the application by exchange of configuration and set-up data, functionality and/or content data. The exchange is implemented as requests for input/output of configuration content and/or functionality, depending on the nature of the respective value-added solution and the context in which the value-added solution is placed. The application-specific environment acts as a broker for the requests to the exchange of configuration, functionality and/or data.

Further according to one embodiment of the surveillance/monitoring system, the one or more applications are selected from the group of: recording application, surveillance application, process/production monitoring application, investigation/analysis application, and system management/administration application.

By mediating the interaction between the application and the value-added solutions and among value-added solutions in an application-independent manner, the interaction is flexible, versatile and provides a high level of connectivity. This allows to efficiently build and maintain surveillance/monitoring systems with a framework of applications capable of coping with a large variety of tasks in for example security, production, building administration, medical observation.

The applications of the management system may be independent of each other or may be configured to interact with each other or use common elements, such as a common configuration repository. The applications may each be dedicated to a specific purpose, such as recording, system administration, analytics, or the like. The different applications may share/require access to the same peripheral devices and/or exploit the same functionalities provided as value-added solutions. However, depending on the purpose, the respective application may require that the interaction is used in a different context than in another application. For example, the same video data retrieved from a camera module may be visualised in completely different manners in different applications, or data retrieved from peripheral sensors in a factory monitoring system may be fed to an alarm system in one application, while in another application the data from the sensor-VAS may forward this data to a factory controller-VAS for adjusting/tuning a deviating process control parameter.

Further according to one embodiment of the surveillance/monitoring system the external component implements a device selected from the group of: video device/system, audio device/system, biometric sensor/system, access control and alarm equipment/system, electrical/magnetic/optical sensors, production process parameter sensors, production control systems, counting sensors, storage/back-up devices.

The external components may provide interaction with a new type of hardware device to be integrated in the surveillance/monitoring system, for example a new type of peripheral device. Peripheral devices may be individual hardware devices, or can be a peripheral system comprising a plurality of devices tied together by a computer controlled central unit. The external component may thus be e.g. another system which is specialised for a different purpose than the main system. For example, an access control system may be represented by a value-added solution and thereby be integrated with a video surveillance system in a manner that allows both systems to exploit the functionality of the other, share configurations, and/or access each others content data so as to form a larger, synergetic system. Providing such external components as a value-added solution has the advantage that the devices may easily be used/reused in different applications of the surveillance/monitoring system.

Further according to one embodiment of the surveillance/monitoring system the external component implements a software module for providing functionality to the surveillance/monitoring system, such as a visualisation module, or an analysis module.

The software module may add particular functionality to the surveillance/monitoring system. Such added functionality may act on a hardware device through interaction with the application or another value-added solution, and/or directly or indirectly act upon the signals/data produced by a peripheral hardware device in the system, wherein the signals/data represent some kind of physical observable that is surveyed, monitored and/or controlled by the surveillance/monitoring system.

Further according to one embodiment of the surveillance/monitoring system license verification is performed by a common verification module of the management system.

Through the application-specific environment, the value-added solution may access and exploit common facilities of the surveillance/monitoring system, such as a common license verification. By using a platform-wide common verification, a simple and user-friendly license handling is achieved that at the same time provides an efficient way of securing revenue for third party providers of value-added solutions.

Another example for using common facilities is a common configuration repository that is established upon configuration of a specific surveillance/monitoring system and maintained according to any changes to the configuration, e.g. due to addition of a new value-added solution. Any component, including the given value-added solution when called in a different context, may subsequently access this common configuration repository.

Further according to one embodiment of the surveillance/monitoring system the value-added solution is downloaded, installed, and/or deployed automatically upon successful license verification.

Thereby the deployment is made particularly easy and flexible, wherein value-added solutions may be activated and/or deactivated depending on a current subscription status. Deployment of the correct value-added solutions for a given surveillance/monitoring system thereby merely becomes a matter of subscription.

Further according to one embodiment of the surveillance/monitoring system the management system is a video management system.

Further according to one embodiment of the surveillance/monitoring system the one or more applications comprise internal components directly implementing hardware, such as cameras, and/or storage devices.

According to a further aspect of the invention, a method is provided for integrating an external component in a surveillance/monitoring system, the surveillance/monitoring system comprising peripheral devices for generating surveillance/monitoring signals and/or data, at least one management system for controlling the peripheral devices, the management system having one or more applications, each application being provided with an application-specific environment, the method comprising the steps of:

provid ing an external component,
providing an application-independent adaption layer through which the external component communicates with the application-specific environment,
associating the application-independent adaption layer with the external component, thereby forming an application-independent value-added solution, and
in the application-specific environment, providing means for interaction of the value-added solution with the surveillance/monitoring system, wherein said means for interaction transparently mediate the interaction by matching at least one first interaction request from the value-added solution with at least one second interaction request from the surveillance/monitoring system, wherein any interaction request from the value-added solution is handled by the application-specific environment according to the context of the application into which the value-added solution is placed, and by fulfilling the interaction when a match is found.

By the method according to the invention the corresponding advantages are achieved as mentioned and discussed above with reference to the surveillance/monitoring system. These advantages include in combination: A unified access to configuration and content data as well as functionality is provided; The interaction is mediated by the application-specific environment and is made transparent; The value-added solutions are independent of the application and of the application type; The content of a value-added solution may be visualised depending on the application in which it is used—including not visualising, but merely processing or storing the content, if that is the purpose of the application in question; By containing the operation of the value-added solution to the application-specific environment, the value-added solution is isolated from the application and the rest of the management-system, thereby achieving considerably improved operational stability; The exposure of functionality and content of the value-added solution to the entire surveillance/monitoring system; Facilitating the use of common functionalities of the surveillance system also by the value-added solution, such as performing license verification of the value-added solution by the license verification module of the management system; Providing an easy and secure way of automated deployment of the value-added solution on the management system based on the common license verification.

The flexible and transparent handling of the interactions between value-added solutions and the different applications of the management system also optimises exploitation of solutions added to the surveillance/monitoring system. While value is added easily by adding new solutions to an existing surveillance system, such added solutions may also easily be reused when revising, updating, re-configuring, expanding or otherwise modifying the surveillance/monitoring system. Furthermore, an existing value chain of already added solutions may easily be exploited or the possibility of exploiting a solution also by coming solutions is facilitated.

Further according to one embodiment of the method according to the invention, the one or more second interaction requests are placed by the application associated with a given application-specific environment and/or by further value-added solutions in the given application-specific environment.

Further according to one embodiment of the method according to the invention, the interaction between the application and the value-added solution comprises configuration and set-up, exchange of functionality, and/or data retrieval and delivery.

BRIEF DESCRIPTION OF THE DRAWINGS

In the following the invention will be explained in further detail with reference to the drawings, wherein the drawing shows schematically on FIG. 1 a prior art system integrating an access control system with a video management system, FIG. 2 a value-added solution, FIG. 3 an application with value-added solutions according to one embodiment of the invention, and FIG. 4 a surveillance/monitoring system according to a further embodiment of the invention.

DETAILED DESCRIPTION OF THE INVENTION

Figure 1:
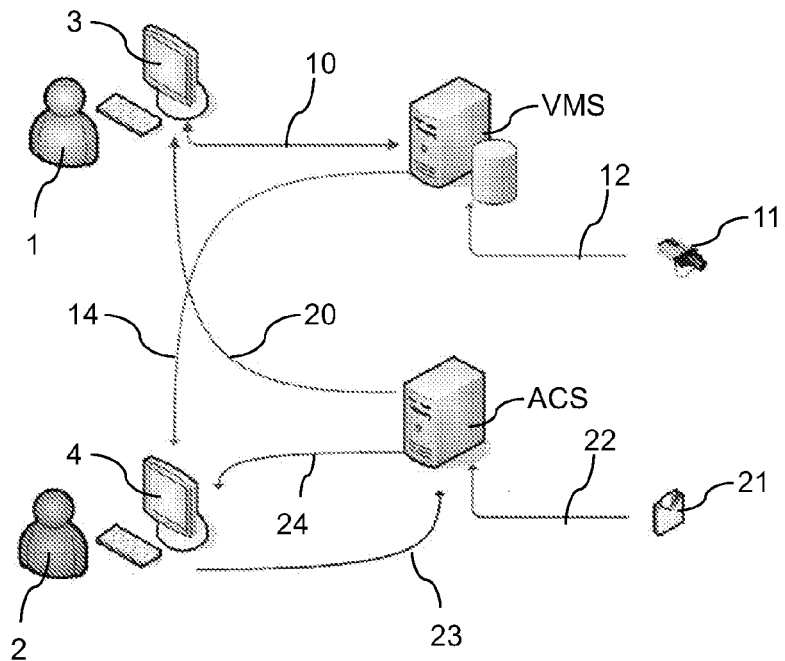

FIG. 1 shows a surveillance/monitoring system comprising a video management system VMS and an access control system ACS. Users 1,2 may interact with the surveillance/monitoring system at terminals 3, 4 for administrative and/or operational tasks, when accessed by an administrator 1 or operator 2 through dedicated administration and operation applications, respectively. The administrator 1 may issue instructions for configuring the VMS through configuration interactions 10 so as to manage the VMS. In the VMS, peripheral devices 11, such as cameras and sensors, are configured. Likewise, the administrator may access configuration data 20 of the ACS, wherein the ACS controls peripheral devices 21, such as access card readers, biometric sensors, door alarms and locks, or the like. The peripheral devices 11, 21 generate signals and/or data 12, 22 that are transmitted to their respective host in the VMS and the ACS. The signals/data 12, 22 may then be processed, stored, e.g. at their respective management/control system VMS, ACS. Furthermore, the data may be presented to the operator 2 at terminal 4 through configuration and content data interactions 14, 24 with an operation application in response to control commands 23. In order to be able to configure and use the two systems, VMS and ACS, in an integrated way, so as to be able to control the systems and exploit information generated by each of the systems in a synergetic way, it is necessary to develop and maintain integration code for each of the administrator and operator application nodes involved.

Taking the integration problem of FIG. 1 as an example, more particularly the integration of a physical door alarm in a VMS, the present invention may solve this problem in the following manner.

In order to have an integrated system, the physical door alarm should be accessible in all aspects of the VMS, both for administration (e.g. system management) and operation (e.g. live surveillance and investigation). The administration and operation applications of the VMS are therefore each provided with an application-specific environment according to the invention. The ACS is considered as an external component. The possible interactions with regard to functionality, configuration and content data are implemented to an application-independent adaption layer so as to present the ACS as a value-added solution to the VMS. Integration of the ACS is then done by configuring the value-added solution in the context of the VMS. Any of the VMS applications may then interact with the ACS value-added solution according to the respective requirements of that application through interaction requests that are mediated accordingly by the application-specific environment.

Figure 2:
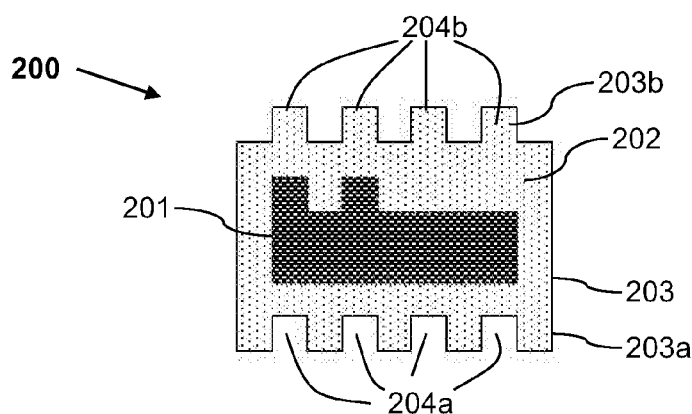

FIG. 2 shows schematically a value-added solution 200 according to the invention. The value-added solution 200 is the only deliverable, which a third party provider has to develop in order to provide a solution that is capable of interacting with all aspects of a compliant surveillance/monitoring system,—including future upgrades/revisions and additions in the form of other value-added solutions.

A third party provider develops a value-added solution 200 by providing an external component 201 and implementing the specific interactions of the external component to an adaption layer 202. The adaption layer 202 comprises an application-independent interaction interface 203 with an input portion 203a having input elements 204a, and an output portion 203b having corresponding output elements 204b.

The external component 201 may represent hardware for generating or receiving signals and/or data. Alternatively or in combination thereto, the external component may also present specific functionality and/or data. When the specific interactions of the external component are implemented to the adaption layer 202 they are subjected to an abstraction so as to comply with the application-independent interaction interface 203 of the adaption layer 202, where they are presented as interaction requests to the input and output elements 204a, 204b.

Figure 3:
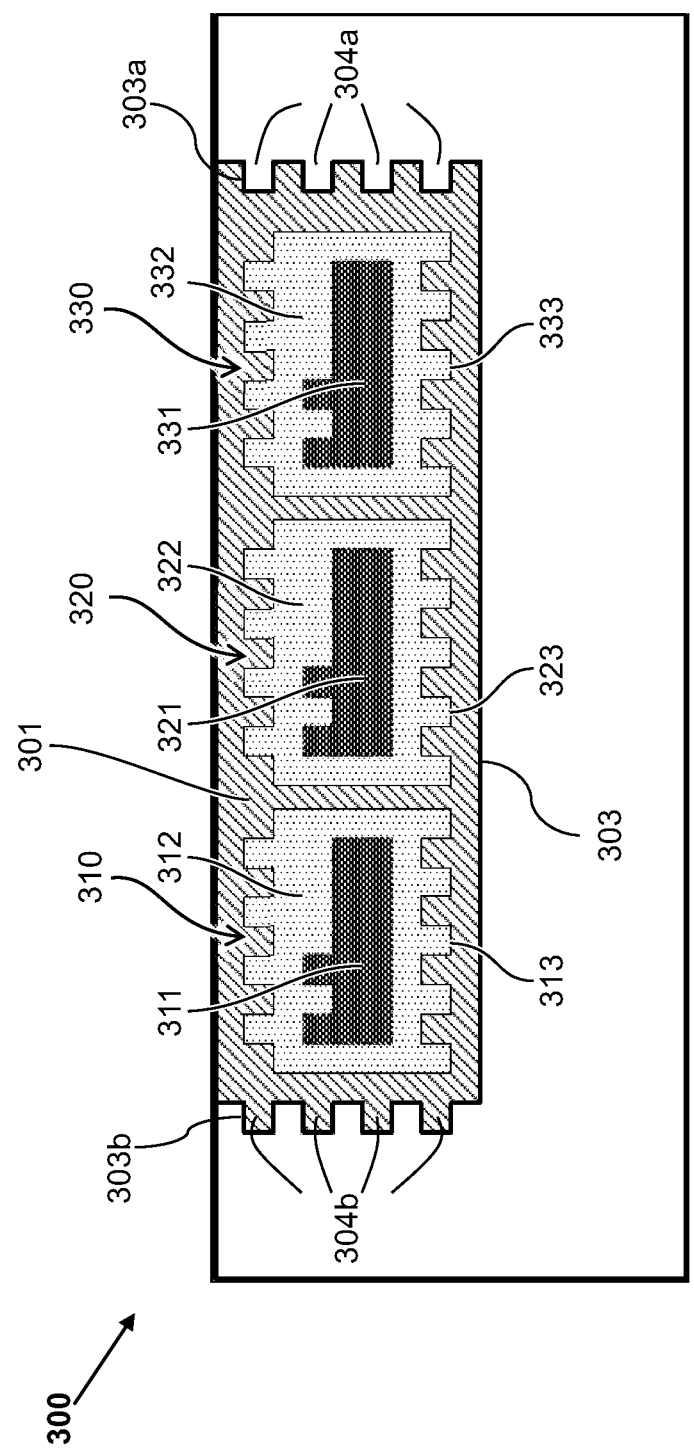

FIG. 3 shows schematically an application 300 comprising an application-specific environment 301 with application-independent interface elements 304a, 304b, where the application 300 can present configuration and content data as well as functionality, i.e. place requests for interaction with value-added solutions 310, 320, 330. The value-added solutions 310, 320, 330 each comprise an external component 311, 321, 331, and an application-independent adaption layer 312, 322, 332 through which the external component 311, 321, 331 communicates with the application-specific environment 301.

The adaption layers of all value-added solutions comply to the same pre-defined interaction interface 313, 323, 333, and the external component 311, 321, 331 communicates with the application-specific environment 301 by implementing interaction requests to the input/output elements of the application-independent interface 313, 323, 333 of the adaption layer 312, 322, 332. Accordingly, also the application-independent interface elements 304a, 304b are arranged to form an interface 303 with an input portion 303a and an output portion 303b, in compliance with the application-independent interaction interface definition.

Interaction among the value-added solutions 310, 320, 330 and between any of the value-added solutions 310, 320, 330 and the application 300 is mediated by the application-specific environment 301 by matching active interaction requests at the interfaces 303, 313, 323, 333 and fulfilling the interaction if a match is found.

Any of the value-added solutions 310, 320, 330 may thus interact with the application 300 and/or any number of further value-added solutions 310, 320, 330 within the application-specific environment 301 of the application 300, wherein the interaction may comprise the exchange of configuration, functionality and/or content data.

For the sake of example, the application 300 may be a security application for recording video surveillance data in mobile units, and the value-added solutions may be an alarm state handler 310, a geographic location and tracking system 320 and a visualisation module 330 providing functionality e.g. for visualising linked/merged data from all the signal generating components of the system, e.g. cameras and microphones handled by the application 300, alarm sensors and triggers handled by the alarm state handler 310, and position trackers handled by the geographic location and tracking system 320. Data from the application 300 and the two signal/data generating value-added solutions 310, 320 are thus passed to the third value-added solution 330 for a consolidated visualisation of all data. If the surveillance/monitoring system for mobile units comprises further applications, such as a system administration application and/or an analysis/investigation application, the same value-added solutions 310, 320, 330 may also be integrated with these applications through respective application-specific environments of the applications.

Figure 4:
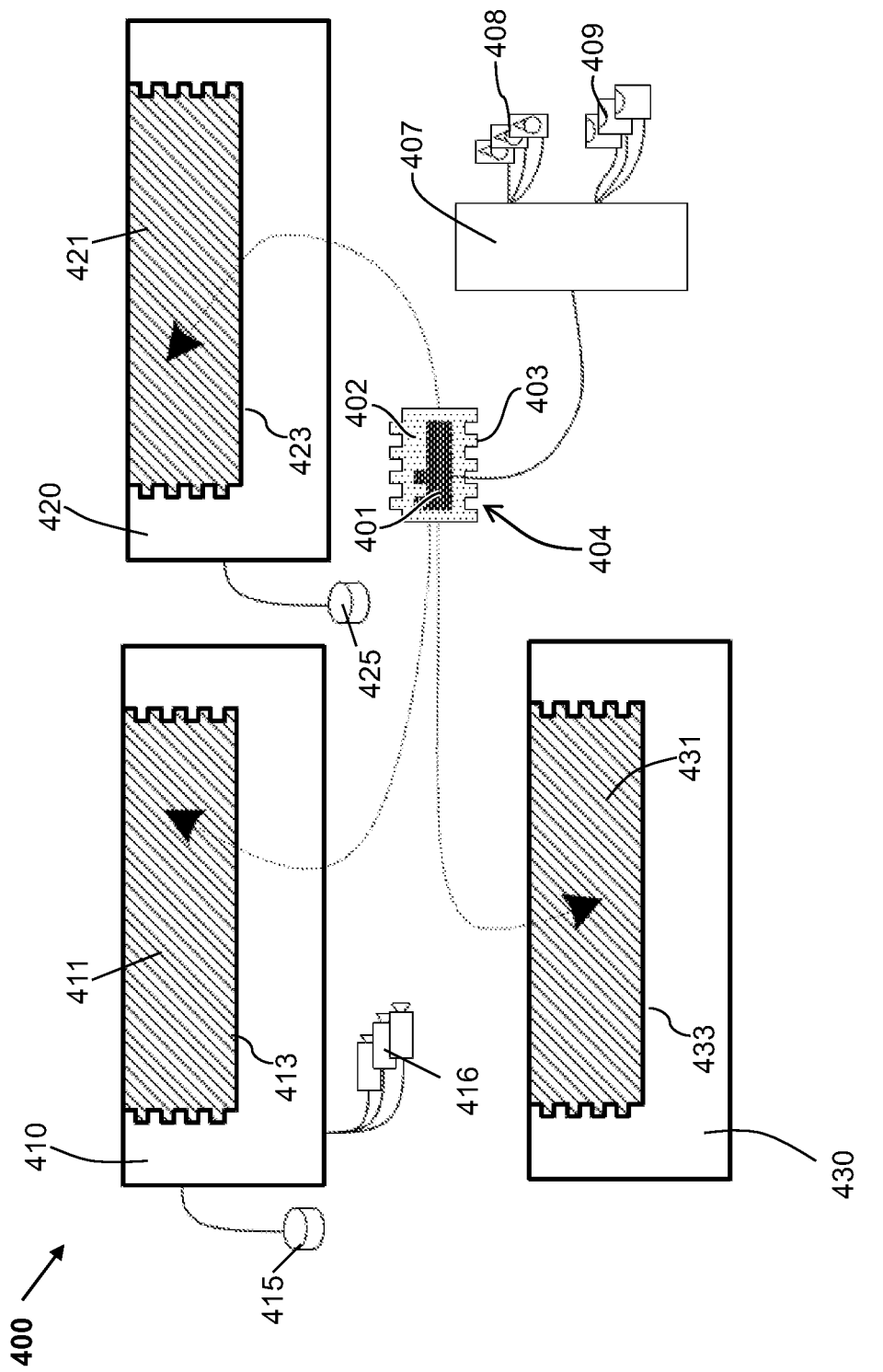

FIG. 4 shows schematically a surveillance/monitoring system 400 comprising a frame-work of different applications 410, 420, 430, each being provided with an application-specific environment 411, 421, 431 having an application-independent interface 413, 423, 433 through which the application 410, 420, 430 can communicate with its application-specific environment 411, 421, 431 in order to establish interaction with value-added solutions provided in the application-specific environment. Each of the applications may or may not interact directly with hardware devices, such as storage 415, 425, or cameras/sensors 416 to name only a few. Such devices handled directly from inside the application may be referred to as internal devices. Additional hardware devices may be accessed as external devices implemented as a value-added solution 404. For example, the value-added solution 404 comprises an external component 401 and an application-independent adaption layer 402 with interface 403. The external component 401 represents and controls an external device, e.g. an access control system 407 controlling peripheral devices 408, 409, such as card readers and/or biometric sensors.

The same value-added solution 404 may be used with any of the applications 410, 420, 430, wherein the value-added solution 404 communicates with each of the application-specific environments 411, 421, 431 through its application-independent adaption layer 402 and interface 403. Each application-specific environment 411, 421, 431 then mediates the interactions of the value-added solution 404 with the respective application 410, 420, 430 and any further value-added solutions according to the context of the application 410, 420, 430.

REFERENCE NUMBERS

VMS Video Management System
ACS Access Control System
1, 2 user
3, 4 terminal
10, 20 configuration interaction
11, 21 peripheral device
12, 22 signals and/or data
14, 24 configuration and/or content data interaction
23 control commands
200 value-added solution
201 external component
202 adaption layer
203 interface
203a, 203b input portion, output portion
204a, 204b input elements, output elements
300 application
301 application-specific environment
303 interface
303a, 303b input portion, output portion
304a, 304b input elements, output elements
310, 320, 330 value added solution
311, 321, 331 external component
312, 322, 332 adaption layer
313, 323, 333 interface
400 surveillance/monitoring system
401 external component
402 adaption layer
403 interface
404 value-added solution
407, 408, 409 external system with peripheral devices
410, 420, 430 application
411, 421, 431 application-specific environment
413, 423, 433 interface
415, 416, 425 devices

The invention claimed is:

1. A surveillance/monitoring system (400), comprising one or more peripheral devices (407, 408, 409, 415, 416, 425) for generating surveillance/monitoring signals and/or data, a management system for controlling the peripheral devices (407, 408, 409, 415, 416, 425), the management system comprising one or more applications (300, 410, 420, 430), characterised in that each application (300, 410, 420, 430) is provided with an application-specific environment (301, 411, 421, 431), the management system further comprising at least one value-added solution (200, 310, 320, 330, 404) placed in context with at least one of the applications (300, 410, 420, 430), each value-added solution (200, 310, 320, 330, 404) comprising an external component (201, 311, 321, 331, 401) and each value-added solution (200, 310, 320, 330, 404) comprising an application-independent adaption layer (202, 312, 322, 332, 402) through which the external component (201, 311, 321, 331, 401) communicates with the application-specific environment (301, 411, 421, 431) by implementing at least one first interaction request to the adaption layer (202, 312, 322, 332, 402) according to a pre-defined application-independent interaction interface (203, 313, 323, 333, 403), wherein the application-specific environment (301, 411, 421, 431) is configured to transparently mediate at least one interaction between the value-added solution (200, 310, 320, 330, 404) and the surveillance/monitoring system (400) by matching the at least one first interaction request with at least one second interaction request from the surveillance/monitoring system (400), wherein any interaction request from the value-added solution (200, 310, 320, 330, 404) is handled by the application-specific environment (301, 411, 421, 431) according to the context of the application (300, 410, 420, 430) into which the value-added solution is placed (200, 310, 320, 330, 404), and fulfilling the interaction if a match is found.

2. The surveillance/monitoring system according to claim 1, wherein the application-specific environment (301, 411, 421, 431) mediates interaction between the value-added solution (200, 310, 320, 330, 404) and the application (300, 410, 420, 430).

3. The surveillance/monitoring system according to claim 1, comprising a plurality of value-added solutions (200, 310, 320, 330, 404) wherein the application-specific environment (301, 411, 421, 431) mediates interaction between different value-added solutions (200, 310, 320, 330, 404).

4. The surveillance/monitoring system according to claim 1, wherein the interaction request is a request for input or a request for output.

5. The surveillance/monitoring system according to claim 1, wherein the interaction comprises exchange of configuration, exchange of functionality and/or retrieval and delivery of content data.

6. The surveillance/monitoring system according to claim 1, wherein the one or more applications are selected from the group of: recording application, surveillance application, process/production monitoring application, investigation/analysis application, and system management/administration application.

7. The surveillance/monitoring system according to claim 1, wherein the external component implements a device selected from the group of: video device/system, audio device/system, biometric sensor/system, access control and alarm equipment/system, electrical/magnetic/optical sensors, production process parameter sensors, production control systems, counting sensors, storage/back-up devices.

8. The surveillance/monitoring system according to claim 1, wherein the external component implements a software module for providing functionality to the surveillance/monitoring system, such as a visualisation module, or an analysis module.

9. The surveillance/monitoring system according to claim 1, wherein license verification is performed by a common verification module of the management system.

10. The surveillance/monitoring system according to claim 9, wherein the value-added solution is downloaded, installed, and/or deployed automatically upon successful license verification.

11. The surveillance/monitoring system according to claim 1, wherein the management system is a video management system (VMS).

12. The surveillance/monitoring system according to claim 1, wherein the one or more applications (300, 410, 420, 430) comprise internal components directly implementing hardware (415, 416, 425), such as cameras, and/or storage devices.

13. A method for integrating an external component (201, 311, 321, 331, 401) in a surveillance/monitoring system (400), the surveillance/monitoring system (400) comprising peripheral devices (407, 408, 409, 415, 416, 425) for generating surveillance/monitoring signals and/or data, at least one management system for controlling the peripheral devices (407, 408, 409, 415, 416, 425), the management system having one or more applications (300, 410, 420, 430), each application (300, 410, 420, 430) being provided with an application-specific environment (301, 411, 421, 431), the method comprising the steps of:

providing an external component (201, 311, 321, 331, 401), providing an application-independent adaption layer (202, 312, 322, 332, 402) through which the external component (201, 311, 321, 331, 401) communicates with the application-specific environment (301, 411, 421, 431), associating the application-independent adaption layer (202, 312, 322, 332, 402) with the external component (201, 311, 321, 331, 401), thereby forming an application-independent value-added solution (200, 310, 320, 330, 404), and in the application-specific environment (301, 411, 421, 431), providing means for interaction of the value-added solution with the surveillance/monitoring system (400), wherein said means for interaction transparently mediate the interaction by matching at least one first interaction request from the value-added solution (200, 310, 320, 330, 404) with at least one second interaction request from the surveillance/monitoring system (400), wherein any interaction request from the value-added solution (200, 310, 320, 330, 404) is handled by the application-specific environment (301, 411, 421, 431) according to the context of the application (300, 410, 420, 430) into which the value-added solution is placed (200, 310, 320, 330, 404), and by fulfilling the interaction when a match is found.

14. The method according to claim 13, wherein the one or more second interaction requests are placed by the application (300, 410, 420, 430) associated with a given application-specific environment (301, 411, 421, 431) and/or by further value-added solutions (200, 310, 320, 330, 404) in the given application-specific environment (301, 411, 421, 431).

15. The method according to claim 14, wherein the interaction between the application (300, 410, 420, 430) and the value-added solution (200, 310, 320, 330, 404) comprises configuration and set-up, exchange of functionality, and/or data retrieval and delivery.

16. The surveillance/monitoring system according to claim 2, comprising a plurality of value-added solutions (200, 310, 320, 330, 404) wherein the application-specific environment (301, 411, 421, 431) mediates interaction between different value-added solutions (200, 310, 320, 330, 404)

\* \* \* \* \*